US011970870B2

(12) United States Patent
Fife

(10) Patent No.: US 11,970,870 B2
(45) Date of Patent: Apr. 30, 2024

(54) FALL RESTRAINT APPARATUS AND ASSOCIATED SYSTEMS AND METHODS

(71) Applicant: The Boeing Company, Chicago, IL (US)

(72) Inventor: Matthew Fife, Everette, WA (US)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 17/538,863

(22) Filed: Nov. 30, 2021

(65) Prior Publication Data

US 2022/0195742 A1 Jun. 23, 2022

Related U.S. Application Data

(60) Provisional application No. 63/126,866, filed on Dec. 17, 2020.

(51) Int. Cl.
*E04G 21/32* (2006.01)
*A62B 35/00* (2006.01)
*A62B 35/04* (2006.01)

(52) U.S. Cl.
CPC ...... *E04G 21/3204* (2013.01); *A62B 35/0068* (2013.01); *A62B 35/0081* (2013.01);
(Continued)

(58) Field of Classification Search
CPC ............ E04G 21/3204; A62B 35/0068; A62B 35/0081; A62B 35/0056; A62B 35/0075; A62B 35/04
See application file for complete search history.

(56) References Cited

U.S. PATENT DOCUMENTS 4,440,261 A * 4/1984 Clark ........................ A62B 1/06 182/142
4,607,724 A * 8/1986 Hillberg ................ E04G 21/329 182/36

(Continued)

FOREIGN PATENT DOCUMENTS

EP 3222798 A1 * 9/2017 ............. A62B 35/00

OTHER PUBLICATIONS

EP Search Report and Written Opinion concerning EP Patent Application No. 21215058.5 dated May 16, 2022.

(Continued)

*Primary Examiner* — Eret C McNichols
(74) *Attorney, Agent, or Firm* — Kunzler Bean & Adamson

(57) ABSTRACT

Disclosed herein is an apparatus for preventing a user from moving beyond a first distance from a support structure. The apparatus comprises an extension member, comprising a first end and a second end that is opposite the first end. The first end is configured to be fixed to the support structure. The second end is movable relative to the first end along a plane and the second end is configured to extend away from the first end to an extended position and retract from the extended position towards the first end to a retracted position. The apparatus also comprises a flexible tether, having a fixed length and comprising an anchor end, attached to the second end of the extension member, and a user end, configured to attach to a user. The extended position is no more than a second distance away from the first end. The sum of the fixed length and the second distance is less than the first distance.

20 Claims, 11 Drawing Sheets

(52) U.S. Cl.
CPC ....... *A62B 35/0056* (2013.01); *A62B 35/0075* (2013.01); *A62B 35/04* (2013.01)

(56) References Cited

U.S. PATENT DOCUMENTS

| | | | | |
|---|---|---|---|---|
| 6,467,576 | B2 * | 10/2002 | Figura | E06C 7/186 182/2.5 |
| 9,623,270 | B2 * | 4/2017 | Palet | A62B 35/0068 |
| 9,993,671 | B2 * | 6/2018 | Huehn | A62C 33/04 |
| 10,347,109 | B2 * | 7/2019 | Troy | G08B 21/0446 |
| 10,463,895 | B2 * | 11/2019 | Palet | F16M 11/2021 |
| 11,285,346 | B2 * | 3/2022 | Palet | A62B 35/0068 |
| 2010/0126801 | A1 * | 5/2010 | Begin | A62B 35/0068 182/3 |
| 2015/0375020 | A1 | 12/2015 | Palet | |
| 2017/0370114 | A1 | 12/2017 | Kornijenko et al. | |
| 2018/0126198 | A1 | 5/2018 | Troy et al. | |
| 2020/0016440 | A1 * | 1/2020 | Palet | F16M 11/26 |
| 2022/0193470 | A1 * | 6/2022 | Voss | A62B 35/0068 |
| 2022/0379148 | A1 * | 12/2022 | Strauss | A62B 35/0068 |
| 2023/0127292 | A1 * | 4/2023 | Palet | B66F 17/006 248/558 |

OTHER PUBLICATIONS

NYSTROM Floor Door Safety Railing, https://www.nystrom.com/products/fall-protection/floor-door-safety-railing accessed Jun. 17, 2021.

Telescopic guardrail, https://www.alibaba.com/product-detail/Telescopicguardrail_60195297723.html?spm=a2700.7724857.normalList.11.5d9d28a8bcSgSY&s=p accessed Jun. 17, 2021.

Diversified Fall Protection, Fall Protection Blog, Jul. 28, 2015, https://www.fallprotect.com/blog/techtalk/what-are-the-differences-between-fall-prevention-restraint-arrest/ accessed Jun. 17, 2021.

* cited by examiner

FALL RESTRAINT APPARATUS AND ASSOCIATED SYSTEMS AND METHODS

FIELD

This disclosure relates generally to an apparatus for preventing a user from moving beyond a certain distance, and more particularly to an apparatus with an extension member that prevents a user from moving an edge of an elevated support surface.

BACKGROUND

Fall restraint apparatuses are used to prevent a user from falling off of an elevated structure. Due to the dimensions and adjustability of some elevated structures, such as an elevated structure that is long and narrow or an elevated structure that is being built, it is difficult for a user to use a fall restraint apparatus and still move around the entirety of the elevated structure. Restricted movement of a user can lead to the user choosing not to utilize a fall restraint apparatus, which results in an unsafe work environment and possible injuries to the user in the case of a fall from the elevated structure.

SUMMARY

The subject matter of the present application provides examples of apparatuses, systems, and methods for preventing a user from moving beyond a certain distance that overcome the above-discussed shortcomings of prior art techniques. The subject matter of the present application has been developed in response to the present state of the art, and in particular, in response to shortcomings of conventional fall restraint apparatuses, and the conventional methods and systems, for preventing a user from moving beyond a certain distance.

Disclosed herein is an apparatus for preventing a user from moving beyond a first distance from a support structure. The apparatus comprises an extension member that comprises a first end and a second end that is opposite the first end. The first end is configured to be fixed to the support structure. The second end is movable relative to the first end along a plane and is configured to extend away from the first end to an extended position and retract from the extended position toward the first end to a retracted position. The apparatus also comprises a flexible tether that has a fixed length and comprises an anchor end, attached to the second end of the extension member, and a user end, configured to attach to a user. The extended position is no more than a second distance away from the first end. The sum of the fixed length and the second distance is less than the first distance. The preceding subject matter of this paragraph characterizes example 1 of the present disclosure.

The extension member comprises a telescoping structure. The preceding subject matter of this paragraph characterizes example 2 of the present disclosure, wherein example 2 also includes the subject matter according to example 1, above.

The telescoping structure comprises a plurality of elongated tubes nested together. Each elongated tube of the plurality of elongated tubes comprises a proximal end and a distal end. The proximal end of an outermost elongated tube of the plurality of elongated tubes defines the first end of the extension member. The distal end of the innermost elongated tube of the plurality of elongated tubes defines the second end of the extension member. The preceding subject matter of this paragraph characterizes example 3 of the present disclosure, wherein example 3 also includes the subject matter according to example 2, above.

The extension member comprises a scissoring structure. The preceding subject matter of this paragraph characterizes example 4 of the present disclosure, wherein example 4 also includes the subject matter according to example 1, above.

The scissoring structure comprises a plurality of folding supports pivotably linked together. Each folding support of the plurality of folding supports comprises two linkages pivotably coupled together to form an X-shape. Each folding support of the plurality of folding supports comprises a proximal end and a distal end. The proximal end of a first folding support defines the first end of the extension member. The distal end of a last folding support defines the second end of the extension member. The preceding subject matter of this paragraph characterizes example 5 of the present disclosure, wherein example 5 also includes the subject matter according to example 4, above.

At least one rail is horizontally fixed to the support structure. The first end of the extension member is movably coupled to the at least one rail. The extension member is configured to move in a first direction and a second direction. The preceding subject matter of this paragraph characterizes example 6 of the present disclosure, wherein example 6 also includes the subject matter according to any one of examples 1-5, above.

The first end slides along the at least one rail in a first direction or a second direction as a force is applied at the second end of the extension member in the same direction. The preceding subject matter of this paragraph characterizes example 7 of the present disclosure, wherein example 7 also includes the subject matter according to example 6, above.

The support structure is selectively movable. The preceding subject matter of this paragraph characterizes example 8 of the present disclosure, wherein example 8 also includes the subject matter according to any one of examples 1-7, above.

The support structure is a lift vehicle. The preceding subject matter of this paragraph characterizes example 9 of the present disclosure, wherein example 9 also includes the subject matter according to example 8, above.

Also disclosed herein is a system for preventing a user from moving beyond a first distance from a support structure. The system comprises an extension member that comprises a first end and a second end that is opposite the first end. The first end is configured to be fixed to the support structure. The second end is movable relative to the first end along a plane and the second end is configured to extend away from the first end to an extended position and retract from the extended position toward the first end to a retracted position. The system also comprises a flexible tether that has a fixed length and comprises an anchor end, attached to the second end of the extension member, and a user end, configured to attach to the user. The system further comprises a controller in electrical communication with the extension member and configured to move the second end of the extension member relative to the first end of the extension member. The extended position is no more than a second distance away from the first end. The sum of the fixed length and the second distance is less than the first distance. The preceding subject matter of this paragraph characterizes example 10 of the present disclosure.

The controller is selectively operable by the user. The preceding subject matter of this paragraph characterizes example 11 of the present disclosure, wherein example 11 also includes the subject matter according to example 10, above.

The system further comprises at least one sensor couplable to an elevated platform. The sensor is configured to detect at least one of a location of the user or an edge of the elevated platform on which the user is supportable and transmit a location signal to the controller. The location signal includes at least one of a detected location of the user or the edge of the elevated platform. The controller is configured to receive the location signal from the sensor and prevent extension of the extension member based on the location signal. The preceding subject matter of this paragraph characterizes example 12 of the present disclosure, wherein example 12 also includes the subject matter according to any one of examples 10-11, above.

The system further comprises a plurality of sensors. The elevated platform further comprises a plurality of interconnectable segments. Each one of the interconnectable segments comprises at least one of the plurality of sensors. The at least one of the plurality of sensors of each one of the interconnectable segments is switchable between an active state and an inactive state based on whether the interconnectable segment defines the edge of the elevated platform. The preceding subject matter of this paragraph characterizes example 13 of the present disclosure, wherein example 13 also includes the subject matter according to example 12, above.

At least one rail is horizontally fixed to the support structure. The extension member is movably coupled to the at least one rail. The controller is configured to move the first end of the extension member along the at least one rail in opposing directions. The preceding subject matter of this paragraph characterizes example 14 of the present disclosure, wherein example 14 also includes the subject matter according to any one of examples 10-13, above.

The extension member is not permitted to move beyond the fixed length of the flexible tether from a lateral distance from the support structure. The preceding subject matter of this paragraph characterizes example 15 of the present disclosure, wherein example 15 also includes the subject matter according to example 14, above.

At least one sensor is couplable to an elevated platform. The sensor is configured to detect at least one of a location of the user or an edge of the elevated platform on which the user is supportable and transmit a location signal to the controller. The location signal includes at least one of a detected location of the user or the edge of the elevated platform. The controller is configured to receive the location signal from the sensor and prevent movement of the extension member along the at least one rail of the extension member based on the location signal. The preceding subject matter of this paragraph characterizes example 16 of the present disclosure, wherein example 16 also includes the subject matter according to any one of examples 14 or 15, above.

The system further comprises a plurality of sensors. The elevated platform further comprises a plurality of interconnectable segments. Each one of the interconnectable segments comprises at least one of the plurality of sensors. The at least one of the plurality of sensors of each one of the interconnectable segments is switchable between an active state and an inactive state based on whether the interconnectable segment defines the edge of the elevated platform. The preceding subject matter of this paragraph characterizes example 17 of the present disclosure, wherein example 17 also includes the subject matter according to example 16, above.

Further disclosed herein is a method for preventing a user from moving beyond a first distance from a support structure. The method comprises securing a user to a user end of a flexible tether, having a fixed length and comprising an anchor end, opposite the user end, attached to a second end of an extension member. The extension member comprises a first end that is opposite the second end. The first end is configured to be fixed to the support structure. The second end is movable relative to the first end along a plane and the second end is configured to extend away from the first end to an extended position and retract from the extended position toward the first end to a retracted position. The method also comprises adjusting a second length of the extension member. In the extended position, the second end is no more than a second distance away from the first end. The sum of the fixed length and the second length is less than the first distance. The preceding subject matter of this paragraph characterizes example 18 of the present disclosure.

The method further comprises operating a controller in electrical communication with the extension member to adjust the second distance of the extension member. The preceding subject matter of this paragraph characterizes example 19 of the present disclosure, wherein example 19 also includes the subject matter according to example 18, above.

The method additionally comprises operating a controller in electrical communication with the extension member to adjust a lateral position of the extension member along at least one rail horizontally fixed to the support structure. The preceding subject matter of this paragraph characterizes example 20 of the present disclosure, wherein example 20 also includes the subject matter according to any one of examples 18-19, above.

The described features, structures, advantages, and/or characteristics of the subject matter of the present disclosure may be combined in any suitable manner in one or more examples, including embodiments and/or implementations. In the following description, numerous specific details are provided to impart a thorough understanding of examples of the subject matter of the present disclosure. One skilled in the relevant art will recognize that the subject matter of the present disclosure may be practiced without one or more of the specific features, details, components, materials, and/or methods of a particular example, embodiment, or implementation. In other instances, additional features and advantages may be recognized in certain examples, embodiments, and/or implementations that may not be present in all examples, embodiments, or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific examples that are illustrated in the appended drawings. Understanding that these drawings depict only typical examples of the subject matter, they are not therefore to be considered to be limiting of its scope. The subject matter will be described and explained with additional specificity and detail through the use of the drawings, in which.

DETAILED DESCRIPTION

Reference throughout this specification to "one example," "an example," or similar language means that a particular feature, structure, or characteristic described in connection with the example is included in at least one example of the present disclosure. Appearances of the phrases "in one example," "in an example," and similar language throughout this specification may, but do not necessarily, all refer to the same example. Similarly, the use of the term "implementation" means an implementation having a particular feature, structure, or characteristic described in connection with one or more examples of the present disclosure, however, absent an express correlation to indicate otherwise, an implementation may be associated with one or more examples.

Figure 1A:
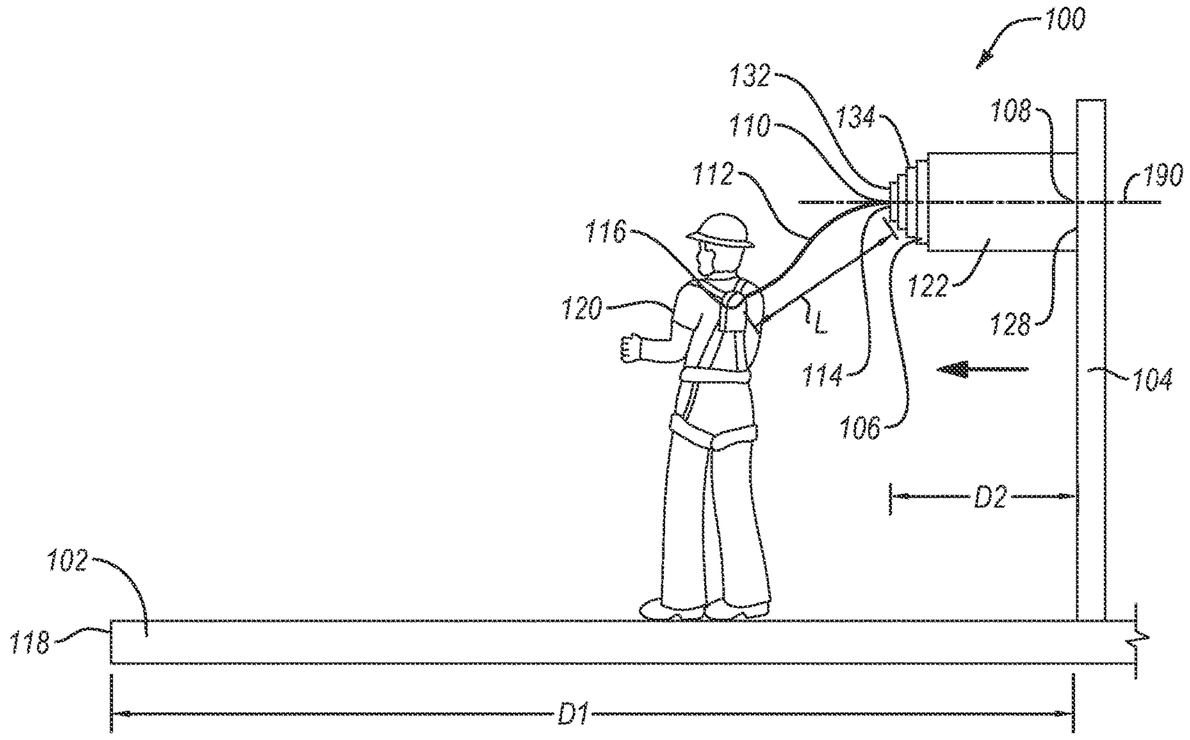
FIG. 1A is a schematic side view of an apparatus for preventing a user from moving beyond a first distance from a support structure, the apparatus being shown in a retracted position, according to one or more examples of the present disclosure.
Figure 1B:
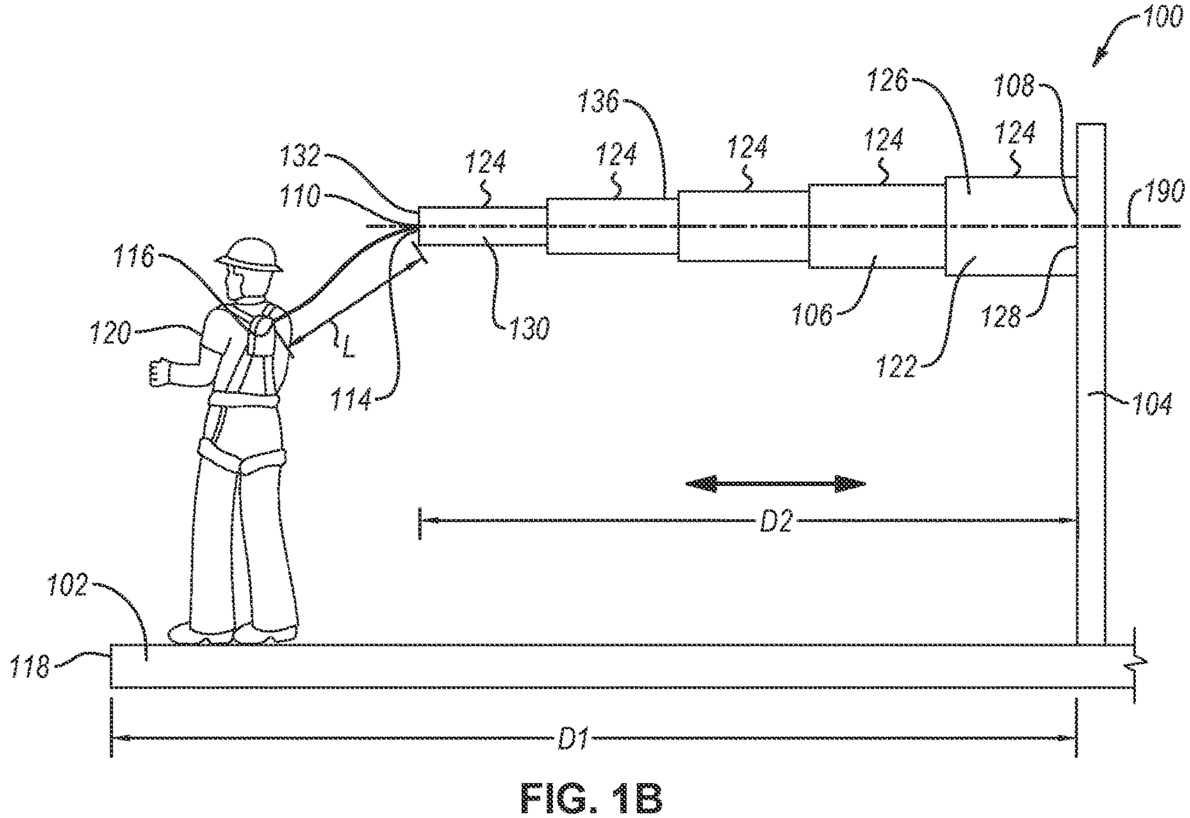
FIG. 1B is a schematic side view of the apparatus of FIG. 1, shown in an extended position, according to one or more examples of the present disclosure.

Referring to FIGS. 1A and 1B, and according to some examples, an apparatus 100 for preventing a user 120 from moving beyond a first distance D1 from a support structure 104 includes an extension member 106 and a flexible tether 112. The flexible tether 112 has a fixed length L and is attached to a second end 110 of the extension member 106, which has an adjustable length D2. The sum of the fixed length L of the flexible tether 112 and the length D2 of the extension member 106 determine the distance a user 120 is able to move away from the support structure 104.

In the FIGS. 1A and 1B, the user 120 is standing on an elevated surface. Although shown as an elevated platform 102, the elevated surface could be any elevated surface that a user 120 could fall from, such as a fixed platform, an expandable platform (e.g. a floor surface that is expanding as flooring tiles are added), a ladder, etc. For illustrative purposes only, the apparatus 100 is shown coupled to the elevated platform 102 and prevents the user 120 moving beyond a first distance D1 from the support structure 104 on the elevated platform 102. The first distance D1 corresponds with the forward edge 118 of the elevated platform 102. Ideally, the apparatus 100 prevents a user 120 from moving beyond any edge 118 on the elevated platform 102, including any front, back, or side edges.

In addition to the second end 110, the extension member 106 has a first end 108 that is opposite the second end 110. The first end 108 is configured to be fixed to the support structure 104. The first end 108 can be non-movably fixed to the support structure 104 or can be movably fixed, such as along a rail system (see, e.g., FIG. 3). The second end 110 of the extension member 106 is movable relative to the first end 108 along a plane 190 or axis. In some examples, the plane 190 is a horizontal plane, as shown in FIG. 1A. In other examples, the plane 190 is a vertical plane. A vertical orientation of the extension member 106 may be used when a user 120 is climbing a ladder or moving in a vertical direction such as along a tree or pole. In yet other examples, the plane 190 is at an angle from a horizontal plane or vertical plane. The angle of the plane 190 may correspond with the angle of the surface the user 120 is moving along. The plane 190 may be fixed or configured to be adjustable. Accordingly, the plane 190 may be adjustable to correspond with the surface along which the user 120 is moving. The extension member 106 can be made of any suitable material with the rigidity to maintain the plane 190 and strength to support a user 120, such material may include, metal, plastic, or a composite material.

The extension member 106 is configured to extend and retract along the plane 190 such that the second end 110 correspondingly moves along the plane 190. As shown in FIG. 1A, the extension member 106 is in a retracted position 134. In the retracted position 134, the extension member 106 has the shortest possible length or second distance D2. Depending on the configuration of the extension member 106, the length D2 of the extension member 106 while retracted can vary in overall distance from the support structure 104. The extension member 106 is also configured to extend from the retracted position 134 to an extended position 136, as shown in FIG. 1B. In some examples, the extension member 106 can freely move to any position between the retracted position 134 and extended position 136. In other examples, the extension member 106 has a locking mechanism that locks the extension member 106 at specific positions between the retracted position 134 and extended position 136.

The extension member 106 may be extended and retracted through any suitable means. In one example, the extension member 106 moves along the plane 190 fully or partially automatically by a mechanical, pneumatic, or hydraulic system that is controlled by a controller 156 (see, e.g., FIG. 3). In another example, the extension member 106 moves along the plane 190 fully or partially manually by the force of the user 120. In other words, the extension member 106 can extend as a user 120 walks away from the support structure 104 along the elevated platform 102 and retract as the user 120 walks toward to support structure 104 along the elevated platform 102.

The extension member 106 may have any configuration that is capable of extending and retracting, including, but not limited to, a telescoping structure 122 or a scissoring structure 138. Referring to FIG. 1A, the extension member 106 has a telescoping structure 122. In one example, the telescoping structure 122 includes a plurality of elongated tubes 124 that are nestable together. The telescoping structure 122 can have any number of elongated tubes 124 necessary for the extension member 106 to extend to an extended position 136. The length of each elongated tube may also vary depending on the length of the extended position 136 of the extension member 106. The telescoping structure 122 includes an outermost elongated tube 126 fixed to the support structure 104. Subsequent elongated tubes 124 are at least partially nested together sequentially and ending with an innermost elongated tube 130. Each elongated tube 124 of the plurality of elongated tubes 124 has a proximal end 128 and a distal end 132. The proximal end 128 of the outermost elongated tube 126 defines the first end 108 of the extension member 106. The distal end 132 of the innermost elongated tube 130 defines the second end 110 of the extension member 106.

In a retracted position 134, all the elongated tubes 124 are nested together and stacked within each other. The elongated tubes 124 may be nested completely within the outermost elongated tube 126 and not be visible when retracted. Accordingly, the second distance D2, in the retracted position 134, would be the length of the outermost elongated tube 126. Alternatively, the elongated tubes 124 may be nested together with each subsequent elongated tube 124 partially visible from the previous elongated tube 124. In this case, the second distance D2, in the retracted position 134, would be the length of the outermost elongated tube 126 plus the length of the each partially visible subsequent elongated tube 124.

In an extended position 136, as shown in FIG. 1B, each elongated tube 124 of the plurality of elongated tubes are fully extended. Accordingly, in the extended position 136, the second end 110 of the extension member 106 is at the greatest possible distance from the support structure 104. In the extended position 136, the user 120 is able to move to the edge 118 of the elevated platform 102, but not permitted to move beyond the edge 118.

Figure 2A:
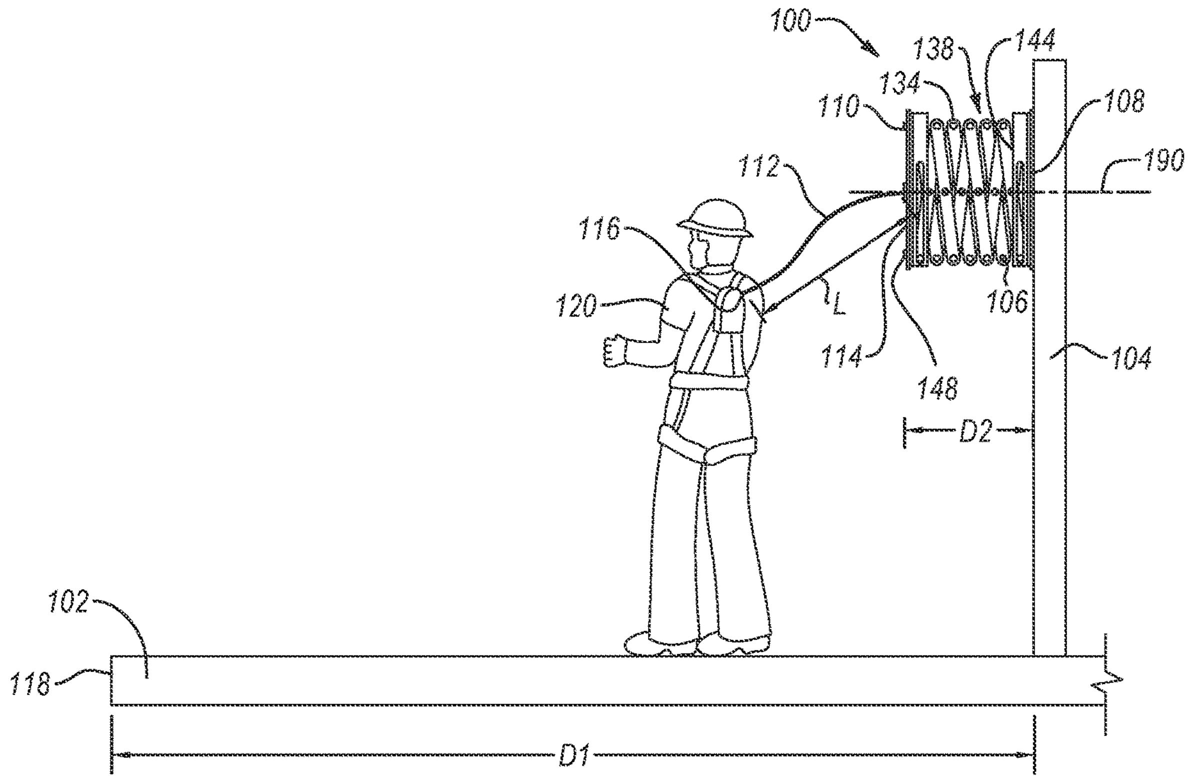
FIG. 2A is a schematic side view of an apparatus for preventing a user from moving beyond a first distance from a support structure, the apparatus being shown in a retracted position, according to one or more examples of the present disclosure.
Figure 2B:
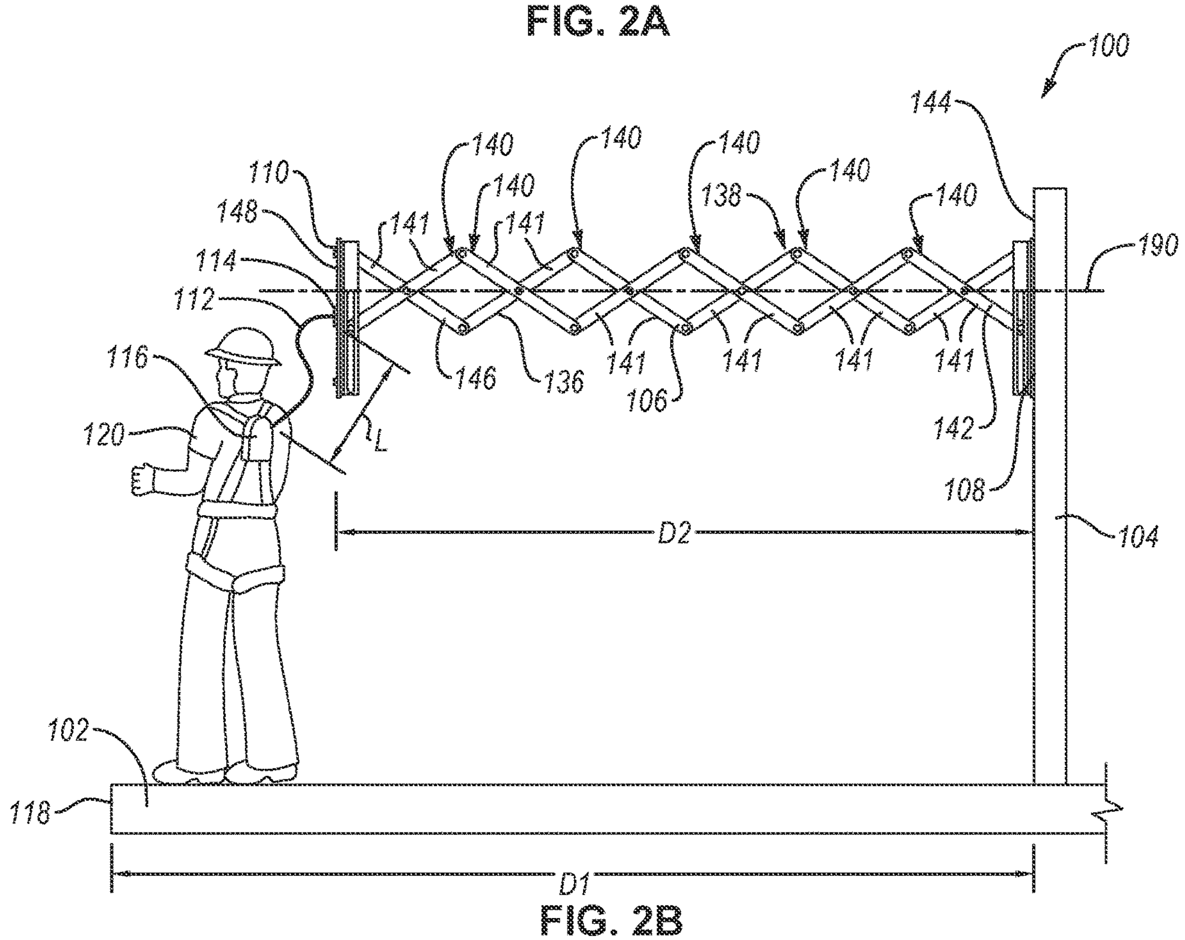
FIG. 2B is a schematic side view of the apparatus of FIG. 1, shown in an extended position, according to one or more examples of the present disclosure.
Figure 3:
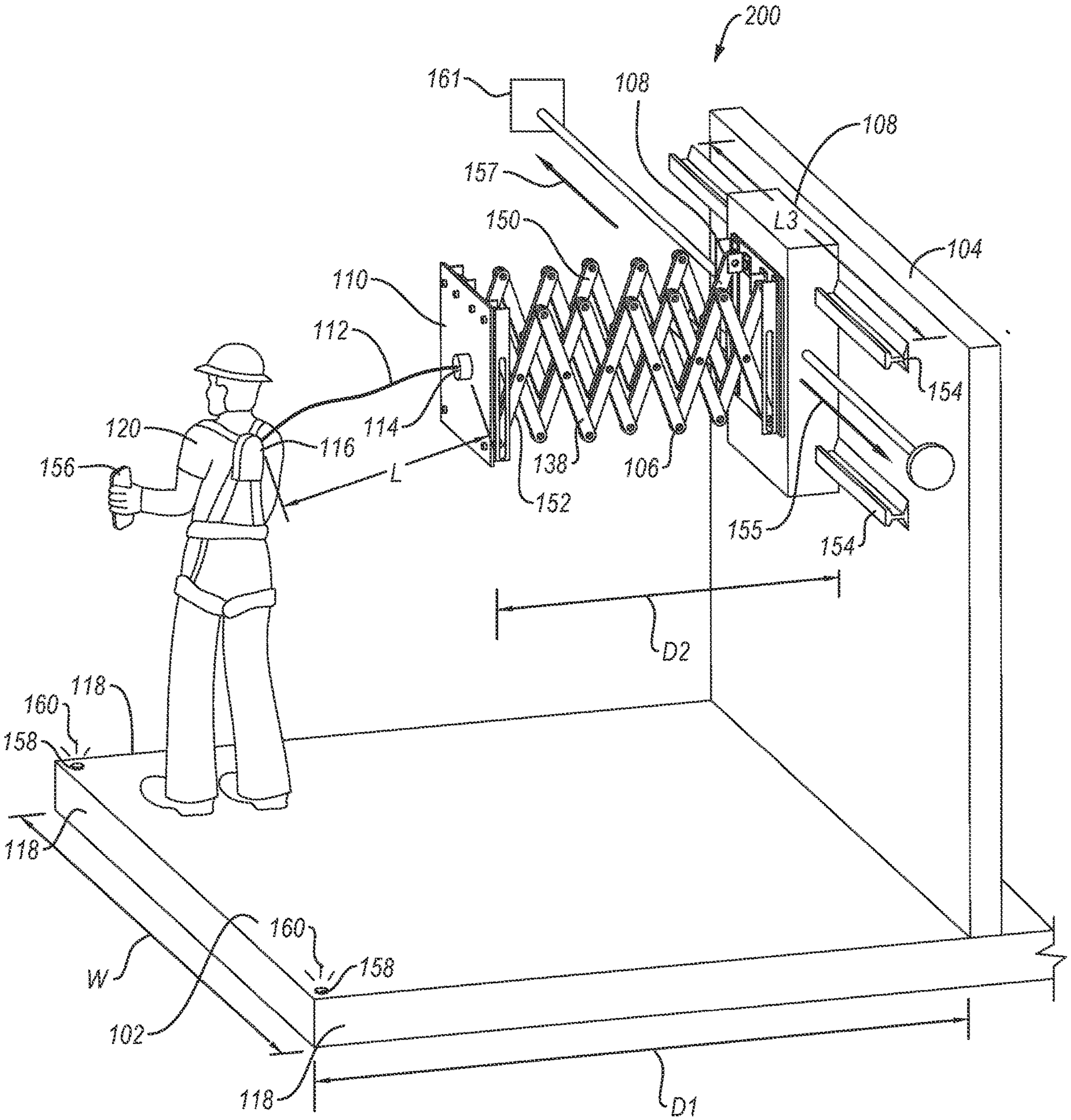
FIG. 3 is a schematic perspective view of a system for preventing a user from moving beyond a first distance from a support structure, according to one or more examples of the present disclosure.

Referring to FIG. 2A and FIG. 2B, the extension member 106 is a scissoring structure 138. In one example, the scissoring structure 138 includes a plurality of folding supports 140 that are pivotably linked together. Each folding support 140 includes two linkages 141 are coupled together to form an X-shape by a pivoting joint, in at the center of the two linkages 141, that allows the upper ends and the lower ends of the two linkages 141 to move towards or away from each other. The linkages 141 have a uniform shape and length, which ensures that the scissoring structure 138 moves along the plane 190. The length of the linkages 141 determine how far the extension member 106 can extend from the support structure 104. The plurality of folding supports 140 each have a proximal end 144 and a distal end 148. The proximal end 144 of a first folding support 142 defines the first end 108 of the extension member 106. The distal end 148 of a last folding support 146 defines the second end 110 of the extension member 106. As shown, the scissoring structure 138 has four folding supports 140, however, it should be understood that the scissoring structure 138 could have any number of folding supports 140. Additionally, the extension member 106 could have multiple rows of scissoring structure 138. For example, as shown in FIG. 3, the extension member 106 has a first row 150 and a second row 152, the scissoring structure 138 of the first row 150 is identical to the scissoring structure 138 of the second row 152.

The extension member 106 is shown in a retracted position 134 in FIG. 2A. In the retracted position 134, the upper ends and lower ends of the two linkages 141 of each folding support 142 are pivoted towards each other. As the extension member 106 is extended the upper ends and lower ends of the two linkages 141 are pivoted away from each other until reaching an extended position 136, as shown in FIG. 2B.

The flexible tether 112 has a fixed length L with an anchor end 114 and a user end 116. The anchor end 114 is attached to the second end 110 of the extension member 106. The flexible tether 112 is preferably attached to the anchor end 114 in a manner that permits the flexible tether 112 to move freely in any direction about the anchor end 114. Accordingly, a variety of loop fasteners or clamping members could be used for this purpose. Since the flexible tether 112 has a single connection point, the range of motion of a user 120 can be described as a circle having an area that depends on the fixed length L of the flexible tether 112. In one example, where the flexible tether 112 has a fixed length L of two feet, the range of motion for the user 120 is approximately 12.5 $ft^2$. Although the range of motion of the user 120 about the second end 110 is fixed, as the user 120 moves along the elevated platform 102 the overall range of motion of the user 120 is increased. In other words, a user 120 is provided with a much larger range of motion compared to a fall restraint device attached to a fixed-location anchor point.

When a flexible tether is attached to a fixed-location anchor point, rather an adjustable-location anchor point (e.g. the second end 110 of the extension member 106), the fixed length L of the flexible tether restricts the range of motion of the user along an elevated surface. A device that provides a greater range of motion by extending the fixed length L of a flexible tether puts a user at greater risk since, as the fixed length L of the flexible tether becomes too long, the user is able to move beyond an edge of the elevated surface and is susceptible to injury if the user falls from the elevated surface. Accordingly, the apparatus 100 prevents a user 120 from falling from the elevated surface and provides a greater range of motion for the user 120 by fixing the length L of the flexible tether 112 and having an adjustable extension member 106. In other words, the adjustable extension member 106 provides a user 120 with a greater range of motion along an elevated surface as the sum of the fixed length L of the flexible tether 112 and the length D2 of the extension member 106 is less than the length of the elevated surface or first distance D1. In some examples, the apparatus 100 is used to prevent a user 120 for falling off of an elevated platform 102 or other elevated horizontal surface. In other examples, the apparatus 100 is used to prevent a user 120 for falling from a ladder or another vertical structure.

The user end 116 of the flexible tether 112 is configured to attach to a user 120. In one example, the user 120 is wearing a fall-arrest harness and the user end 116 is attached to the harness. The harness may comprise a body belt or can include a full chest harness. The flexible tether 112 can be a rope, cable, strap, lanyard, etc. and made from any material that is flexible while maintaining the fixed length L.

Referring to FIG. 3, a system 200 for preventing a user 120 from moving beyond a first distance D1 from a support structure 104 is shown. The system 200 includes an extension member 106 and a flexible tether 112, as described in connection to FIGS. 1A-2B, above. The system 200 also includes a controller 156 that is configured to move the second end 110 of the extension member 106. The controller 156 is in electrical communication with the extension member 106. In one example, the controller 156 is electrically wired to the extension member 106. In another example, the controller 156 is in wireless communication with the extension member 106, such as Bluetooth, or Wi-Fi.

In some examples, the controller 156 is selectively operated by a user 120. The user 120 may hold the controller 156 in their hands or have the controller 156 connected on their body or harness. The user 120 can operate the controller 156 to control the extension and retraction of the second end 110 of the extension member 106. The controller 156 may have manual buttons or a touch screen that the user 120 can engage to control the movement and length D2 of the extension member 106. Alternatively, the controller 156 may be operated by a person outside of the apparatus 100 rather than the user 120. In other words, a person, generally another worker who is watching the user 120 from the ground or another safe area, can operate the controller 156. The operation of the controller 156 from another worker may be helpful in cases where the user 120 needs hands-free operation of the extension member 106, such as when climbing a ladder.

The system 200 can further include at least one sensor 158 coupled to the elevated platform 102. The sensor 158 is in electrical communication with the controller 156 and is configured to transmit a location signal 160 to the controller 156. Any number of sensors 158 can be coupled to the elevated platform 102. The sensors 158 are coupled to the elevated platform 102 along the edges 118 of the elevated platform 102. Alternatively, or additionally, the sensors 158 are coupled at inward locations along the elevated platform 102.

In one example, a sensor 158 is used to detect the location of a user 120 along the elevated platform 102 and transmit a location signal of the user's location to the controller 156. The controller 156 can use the location signal 160 to determine if the extension member 106 can be extended or if the extension member 106 is prevented from extending to ensure the user 120 is prevented from moving beyond the elevated platform 102. In other words, the controller 156 can allow or prevent the extension of the extension member 106 based on the location of the user 120. In another example, a sensor 158 is used to detect the location of an edge 118 of the elevated platform 102 and transmit a location signal 160 of the edge 118 to the controller 156. Using the location signal 160, the controller 156 can determine if the extension member 106 can be extended or is prevented from extending.

As shown in FIG. 3, at least one rail 154 is horizontally fixed to the support structure 104. The first end 108 of the extension member 106 is movably coupled to the rail 154 and moves along the rail 154 in a first direction 155 and a second direction 157. In one example, the first end 108 of the extension member 106 moves along the rail 154 as the user 120 applies force at the second end 110 of the extension member 106 in the same direction. In other words, the extension member 106 moves in a first direction 155 as the user 120 applies a force in the first direction and the extension member 106 moves in a second direction 157 as the user 120 applies a force in the second direction. The rail 154 has a length L3 that will prevent the user 120 from moving move than the fixed length L of the flexible tether 112 from the edge 118 of the elevated platform 102. In another example, the controller 156 controls the movement of the extension member 106 along the rail 154. The controller 156 does not permit the extension member 106 to move closer to the edge 118 of the elevated platform 102 then the fixed length L of the flexible tether 112. The rail 154 could be a mechanical system, such as a worm gear controlled by a motor 161, or a hydraulic or pneumatic system.

Figure 4:
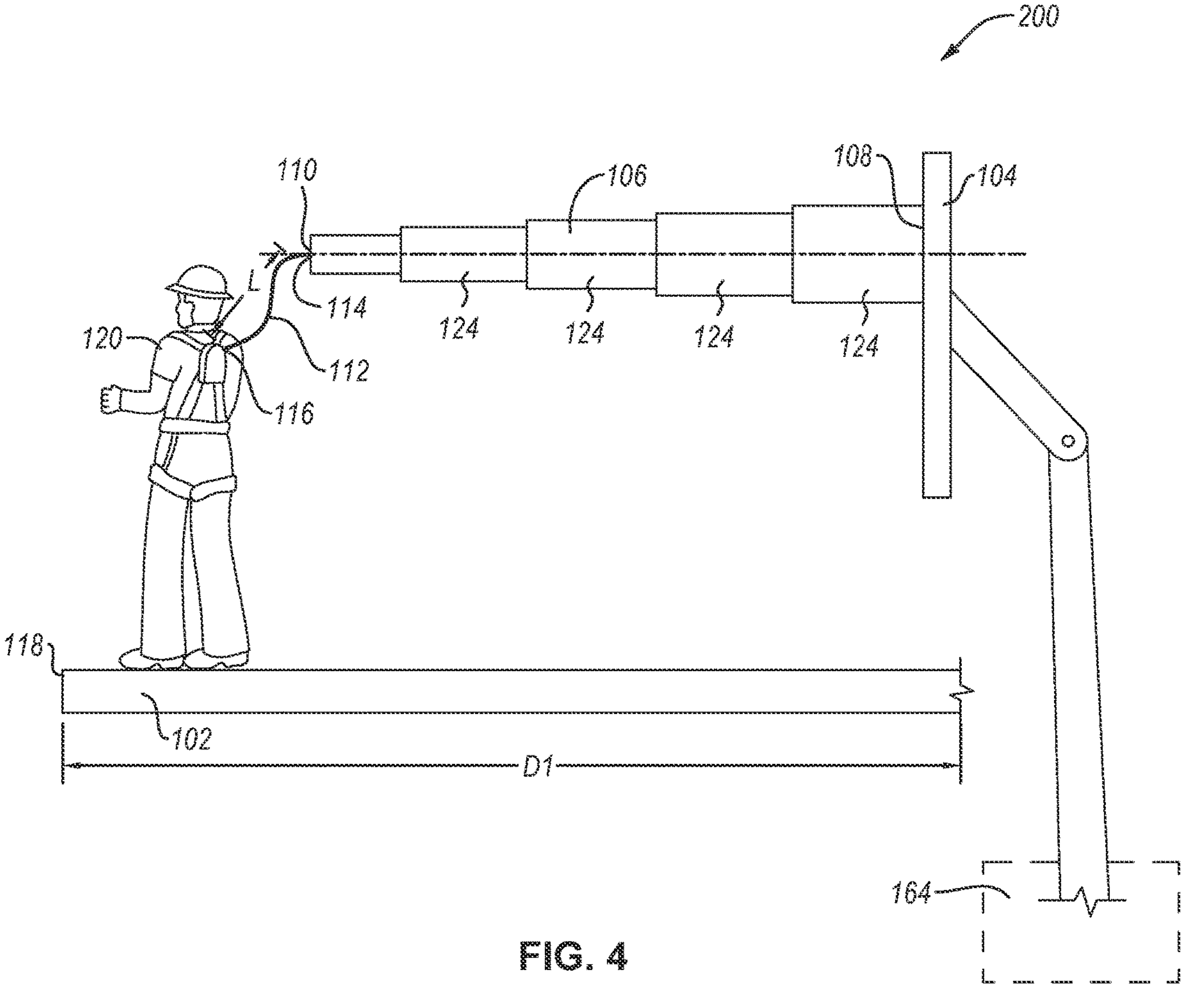
FIG. 4 is a schematic side view of an apparatus for preventing a user from moving beyond a first distance from a movable support structure, according to one or more other examples of the present disclosure.

The support structure 104 as shown in FIGS. 1A-2B is fixed relative to the elevated platform 102, such as a wall or building. However, in other examples, the support structure 104 is selectively movable, as shown in FIG. 4. A moveable support structure 104 may be a lift vehicle 164. The support structure 104 can be moved along the length of the elevated platform 102 as needed to allow the user 120 to access the elevated platform 102 while maintaining the necessary distance from any of the edges 118. Whatever type or configuration of support structure 104 is used, the first end 108 of the extension member 106 is attached to the support structure 104. In some examples, the extension member 106 is integrally formed with the support structure 104. In other examples, the extension member 106 may be attached to the support structure 104 by any means including welding or fastening with screws, bolts, etc.

The extension member 106 is typically fixed to the middle of the support structure 104 at any location along the height of the support structure 104. This allows the user 120 to stay equidistant from the side edges 118 of the elevated platform 102. If the support structure 104 includes rails 154, the rails 154 are attached to the support structure 104 in order to prevent the user 120 from moving beyond to the side edges, as well.

Figure 5A:
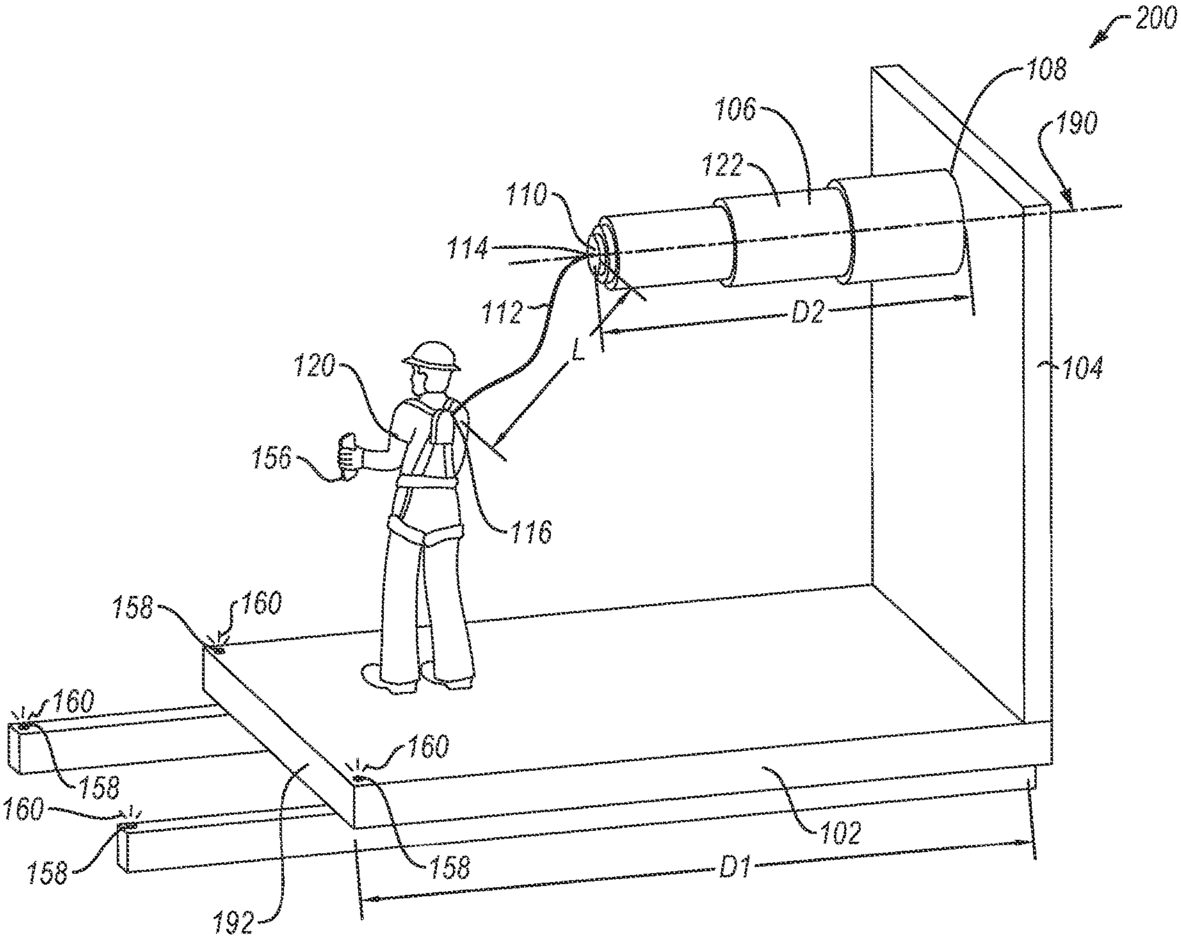
FIG. 5A is a schematic perceptive view of a system for preventing a user from moving beyond a first distance from a support structure, the system comprising sensors couplable to an elevated platform, according to one or more additional examples of the present disclosure.
Figure 5B:
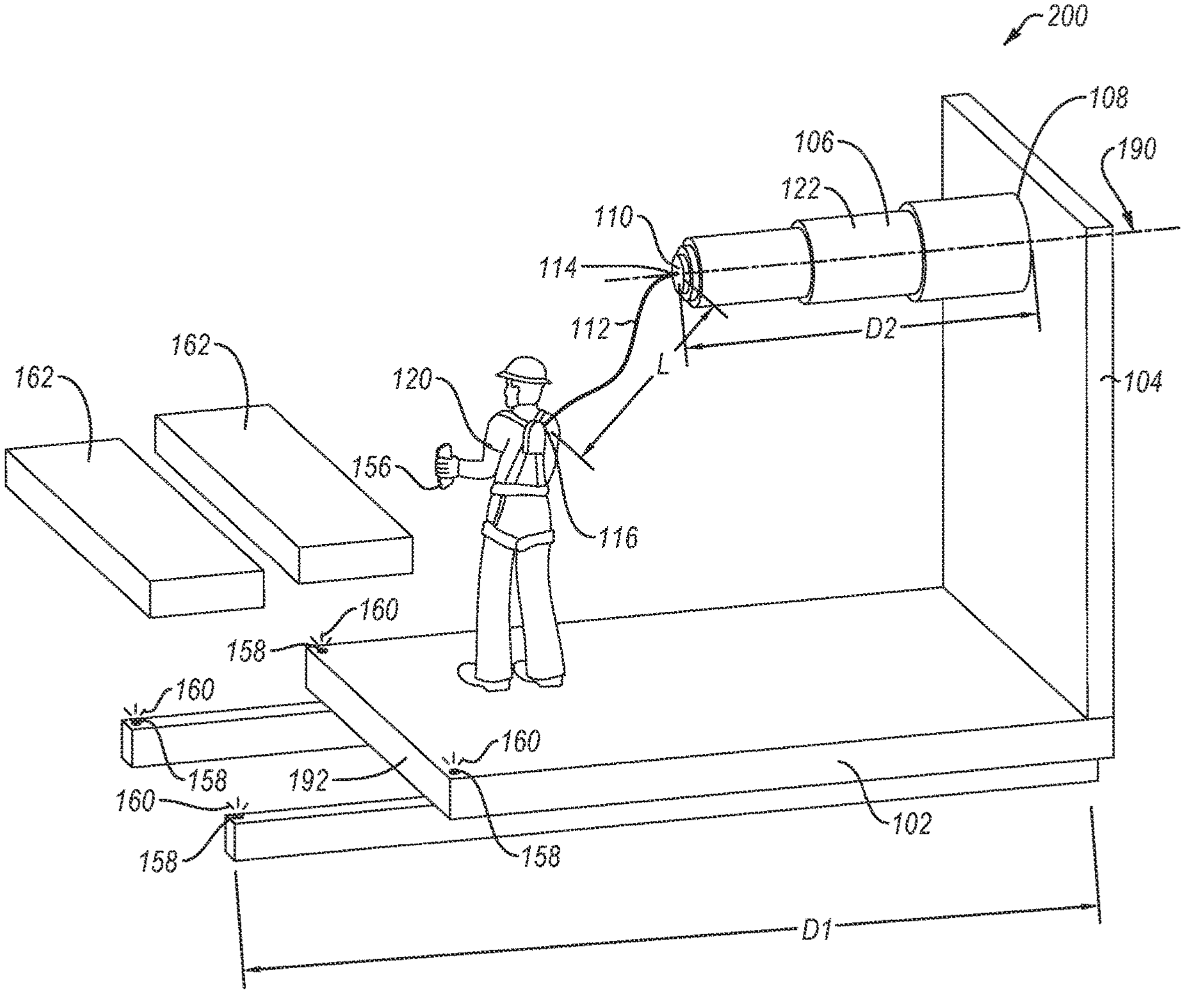
FIG. 5B is a schematic perspective view of the system of FIG. 5A, the system comprising a plurality of interconnectable segments before the interconnectable segments are added to the elevated platform, according to one or more examples of the present disclosure.
Figure 5C:
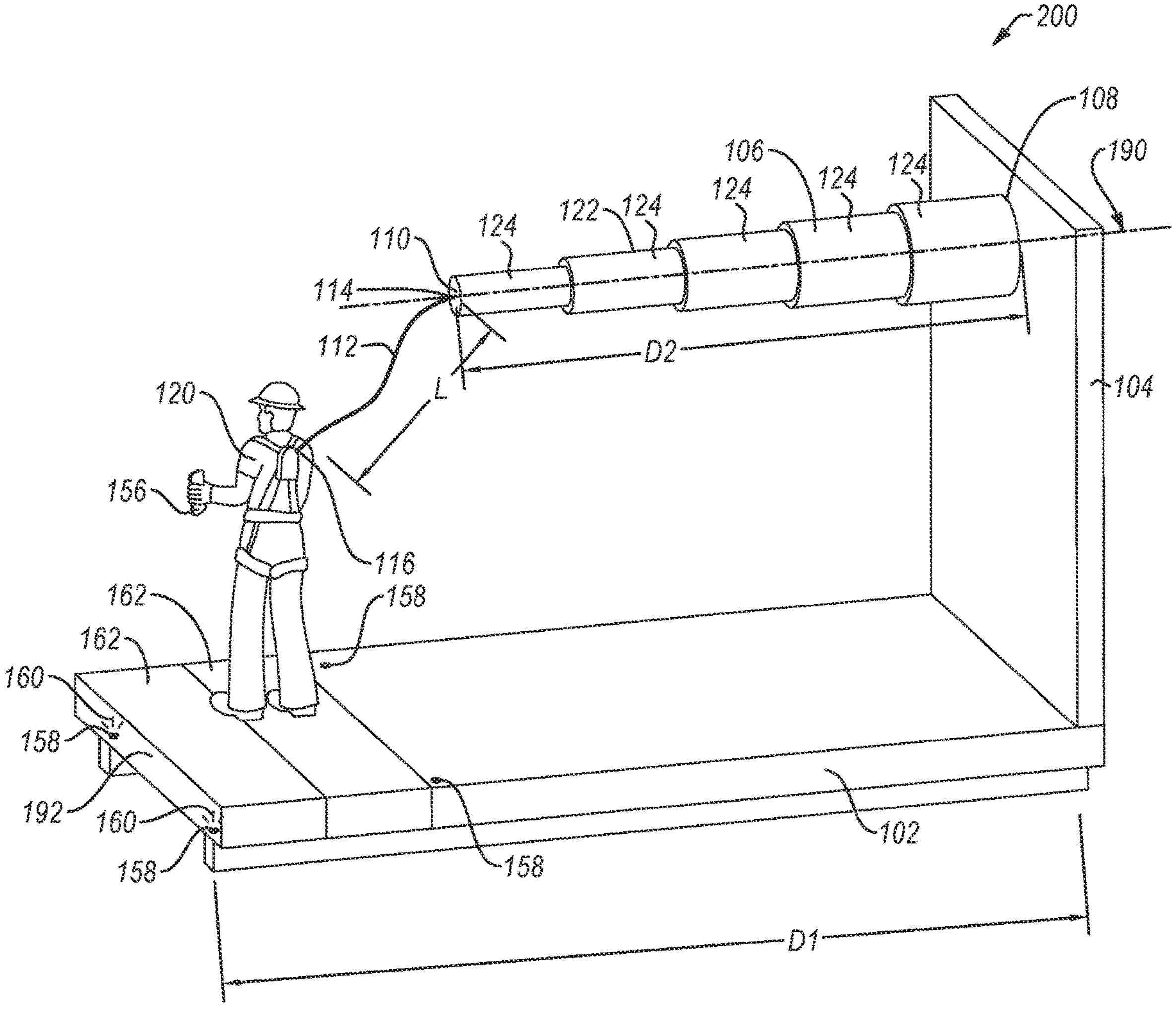
FIG. 5C is a schematic perspective view of the system of FIG. 5A, the system comprising a plurality of interconnectable segments after the interconnectable segments are added to the elevated platform, according to one or more examples of the present disclosure.

Referring to FIGS. 5A-5C, a system 200 has an elevated platform 102 with a plurality of interconnectable segments 162. At least one sensor 158 is a located at the forward edge 192 of the elevated platform 102. The sensor 158 transmits a location signal 160 to the controller 156. In one example, the sensor 158 transmits a location signal 160 for the forward edge 192 of the elevated platform 102 to the controller 156. The controller 156 prevents the movement of the extension member 106 when the location signal 160 indicates that the second end 110 of the extension member 106 is a fixed length L from the sensor 158. In other examples, the sensor 158 detects the location of the user 120 and transmit a location signal 160 of the user 120 to the controller 156. In this case, the controller 156 prevents the movement of the extension member 106 when the location signal 160 indicates that the user 120 is at the edge 192 of the elevated platform 102.

In some cases, the elevated platform 102 can be extended as the user 120 is on the elevated platform 102. For example, a user 120 may install floor tiles to extend the elevated platform 102. In this case, the edge 192 of the elevated platform 102 is extended a further distance D1 from the support structure 104. As shown in FIG. 5B, interconnectable segments 162 are capable of being added to the forward edge 192 of the elevated platform 102. The interconnectable segments 162 have at least one sensor 158 that can transmit a location signal 160. As each interconnectable segments 162 is added to the elevated platform 102 a new forward edge 192 is defined. The sensors 158 can switch between an active state, in which the sensor 158 transmits a location signal 160 or detects the user's location and an inactive state, in which the location signal 160 is not transmitted or the controller 156 overrides the location signal 160. As a new edge 192 is defined, the sensor 158 at the new edge 192 is activated and the sensors 158 that are no longer at the edge 192 are inactivated. This allows the extension member 106 to continue extending so the user 120 is able to reach the new edge 192, as shown in FIG. 5C.

Figure 6A:
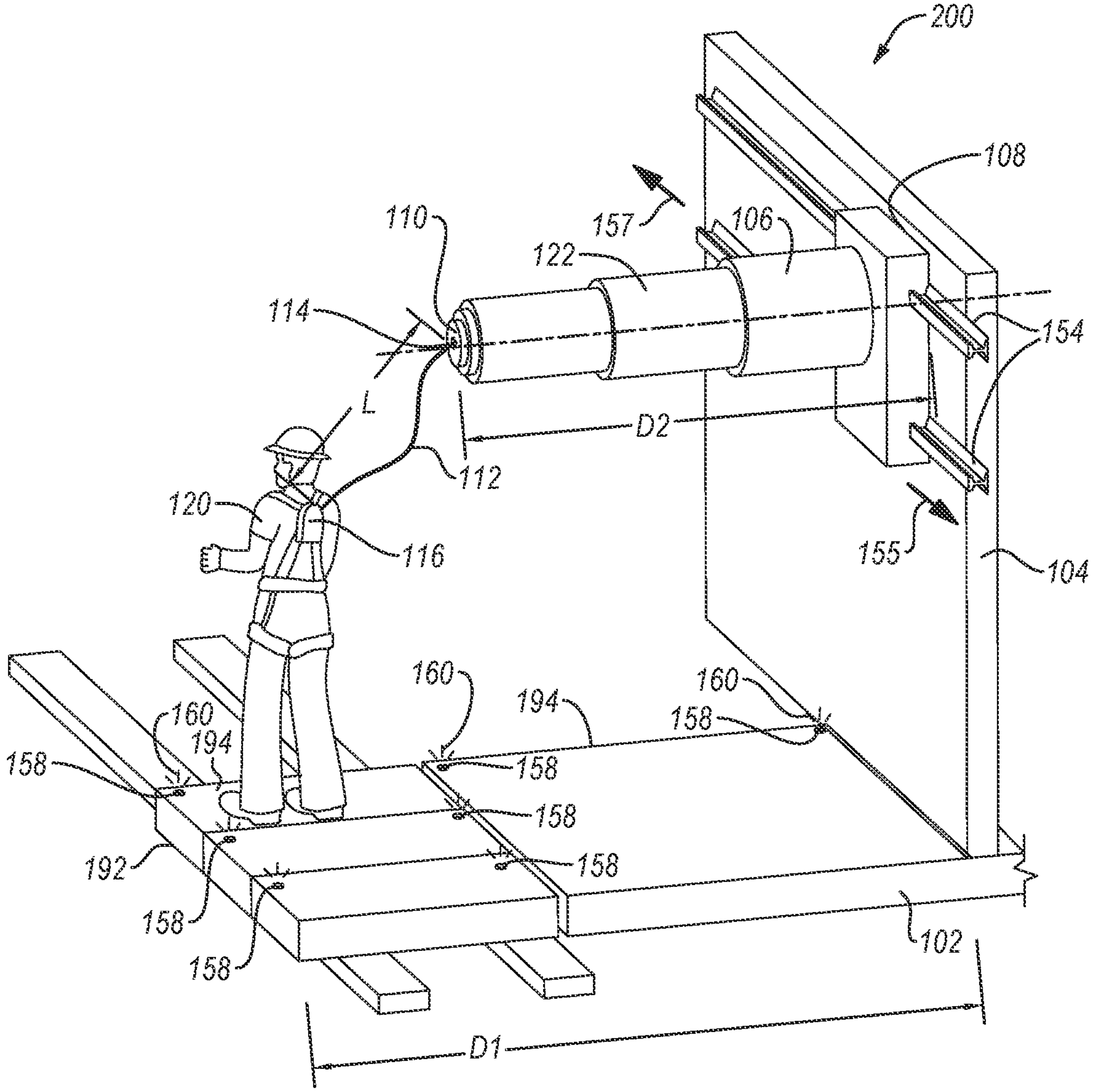
FIG. 6A is a schematic perspective view of a system for preventing a user from moving beyond a first distance from a support structure, the system comprising sensors couplable to an elevated platform, according to one or more additional examples of the present disclosure.
Figure 6B:
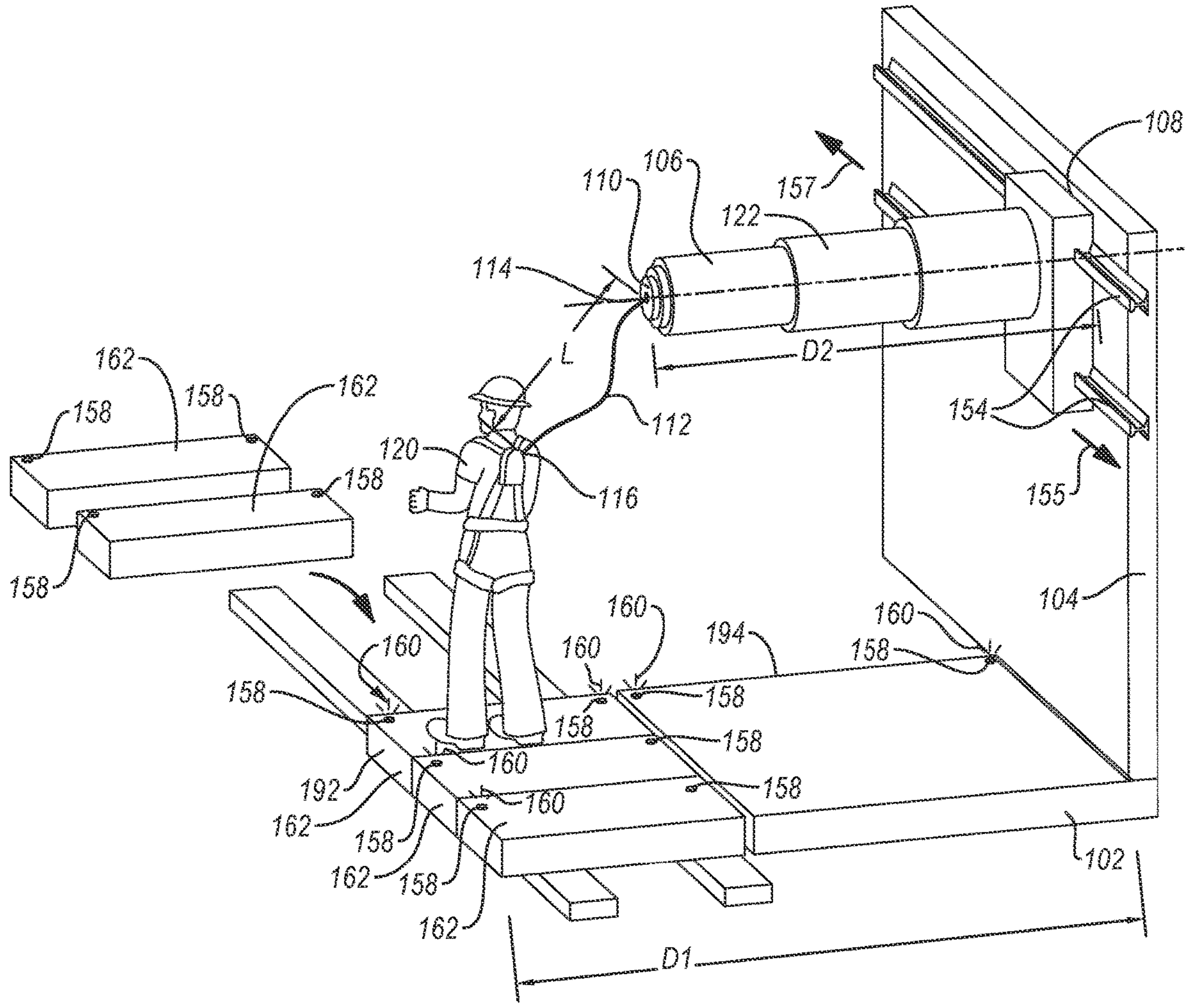
FIG. 6B is a schematic perspective view of the system of FIG. 6A, the system comprising a plurality of interconnectable segments shown before the interconnectable segments are added to the elevated platform, according to one or more examples of the present disclosure.
Figure 6C:
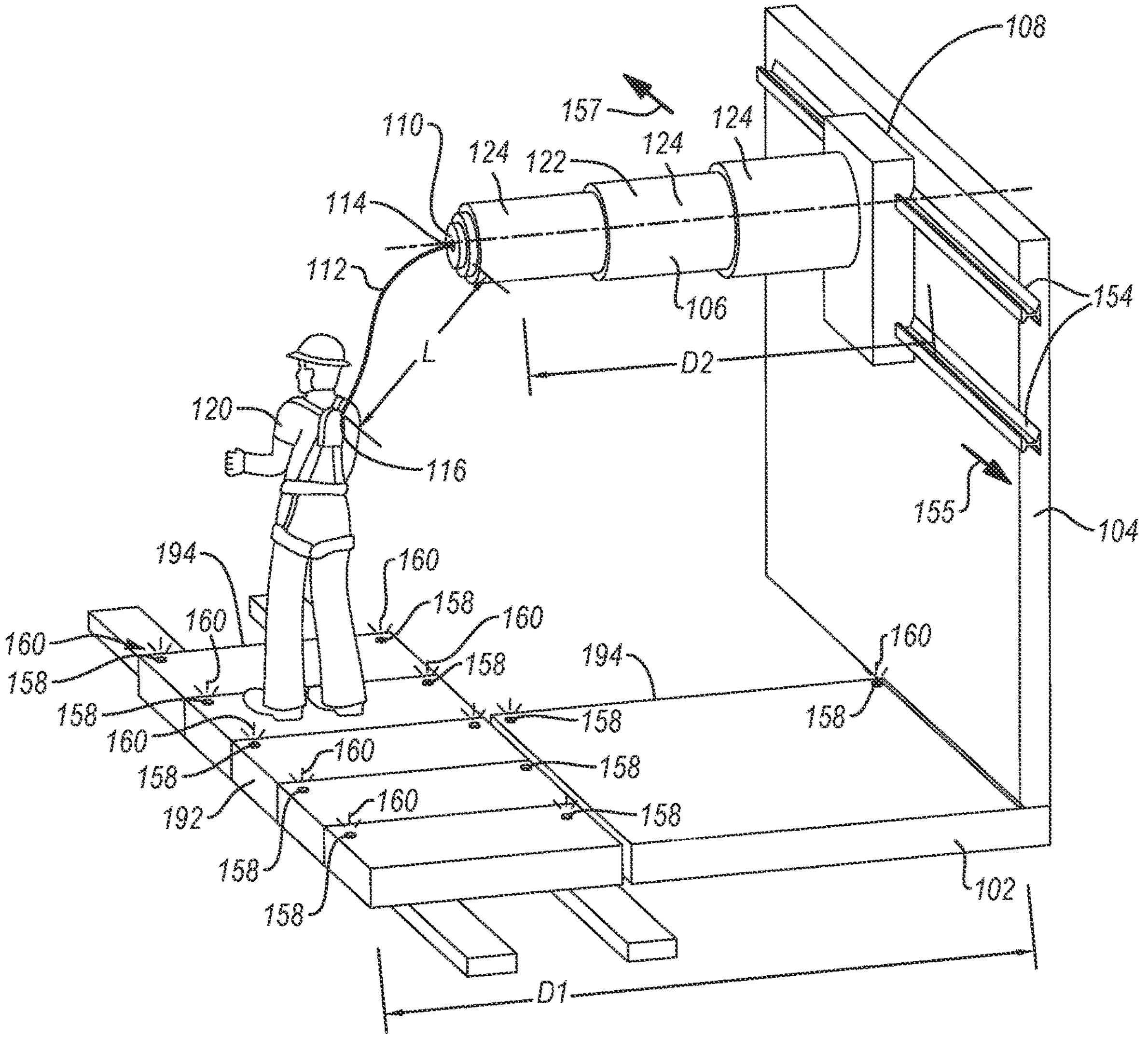
FIG. 6C is a schematic perspective view of the system of FIG. 6A, showing the plurality of interconnectable segments after the interconnectable segments are added to the elevated platform, according to one or more examples of the present disclosure.

Referring to FIG. 6A-6C, a system 200 has an elevated platform 102 that is extendable along a forward edge 192 and/or side edge 194 of the elevated platform 102. At least one sensor 158 is located at the forward edge 192 and/or the side edges 194 of the elevated platform 102. As interconnectable segments 162 are added to the forward edge 192 of the elevated platform 102, the sensors 158 that are the furthest length, D1, from the support structure 104 are activated and control the length D2 that the extension member 106 can extend. Additionally, interconnectable segments 162 can be added to the side edge 194 of the elevated platform 102. The sensors 158 along the side edge 194 transmits locations signals 160 to the controller 156.

Rails 154 are horizontally fixed to the support structure 104 and the extension member 106 can move in opposing directions along the rails 154. In some examples, the controller 156 prevents movement of the extension member 106 along the rails 154 when the location signal 160 indicates that the second end 110 of the extension member 106 is a fixed length L from the sensor 158. In other examples, the controller 156 prevents the movement of the extension member 106 when the location signal 160 indicates that the user 120 is at the edge 194 of the elevated platform 102. As additional interconnectable segments 162 are added to extend the elevated platform 102 along the side edge 194, a new side edge 194 is defined. At the newly defined side edge 194 the sensor 158 is activated and all sensors 158 that are no longer at the edge 194 are inactivated. The extension member 106 can move in the second direction 157 along the rails 154 and the user 120 can reach the new edge 194, as shown in FIG. 6C. Alternatively, rather than adjusting the extension member 106 along the rails 154 the support structure 104, itself, can be moved laterally to allow the user 120 to reach the new edge 194.

Figure 7:
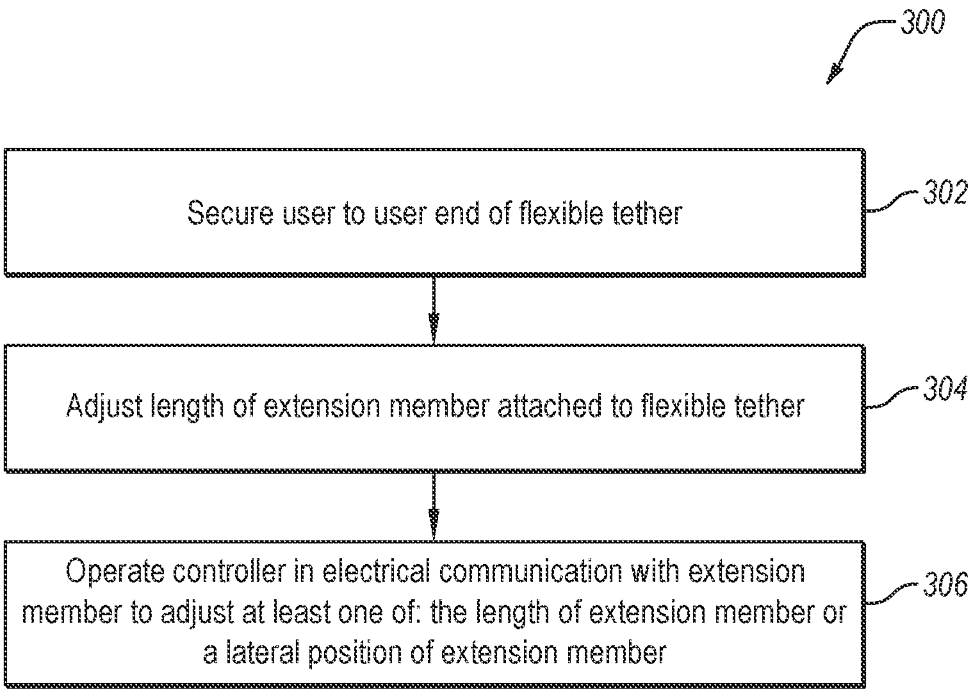
FIG. 7 is a schematic flow diagram of a method of preventing a user from moving beyond a first distance from a support structure, according to one or more examples of the present disclosure.

Now referring to FIG. 7, according to certain examples, a method 300 of preventing the user 120 from moving beyond the first distance D1 from the support structure 104 is shown. The method 300 is performed using any one or more of the examples of the apparatus 100 or the system 200 disclosed herein. The method 300 includes (block 302) securing the user 120 to the user end 116 of the flexible tether 112 having a fixed length L. The anchor end 114, opposite of the user end 116, is attached to the second end 110 of the extension member 106. The extension member 106 includes the first end 108 that is opposite the second end 110 and is configured to be fixed to the support structure 104. The second end 110 is movable relative to the first end 108 along the plane 190 and the second end 110 is configured to extend away from the first end 108 to the extended position and retract from the extended position toward the first end 108 to the retracted position. The method 300 also includes (block 304) adjusting a length of the extension member 106. In the extended position, the second end 110 is no more than the second distance D2 away from the first end 108 and the sum of the fixed length L and the second distance D2 is less than the first distance D1.

In certain examples of the method 300, the method further includes (block 306) operating a controller 156 in electrical communication with the extension member 106 to adjust the extension member 106. In some examples, the controller 156 adjusts the second distance D2 or the length of the extension member 106. In other examples, the controller 156 adjusts a lateral position of the extension member 106 along at least one rail 154 horizontally fixed to the support structure 104. Furthermore, the controller 156 can adjust both the second distance D2 of the extension member 106 and the lateral position of the extension member 106 along at least one rail 154 horizontally fixed to the support structure 104.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two."

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The schematic flow chart diagrams included herein are generally set forth as logical flow chart diagrams. As such, the depicted order and labeled steps are indicative of one example of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The present subject matter may be embodied in other specific forms without departing from its spirit or essential characteristics. The described examples are to be considered in all respects only as illustrative and not restrictive. All changes which come within the meaning and range of equivalency of the claims are to be embraced within their scope.

What is claimed is:

1. A fall restraint apparatus comprising:
an extension member, comprising a first end and a second end that is opposite the first end, wherein:
the second end is movable, relative to the first end, in a first direction and a second direction, opposite the first direction, along a plane; and
the second end is configured to extend away from the first end to an extended position and retract from the extended position toward the first end to a retracted position;
at least one rail to which the extension member is movably coupled so that the extension member is movable in a third direction along the at least one rail, the third direction being angled relative to the first direction and the second direction; and
a flexible tether, having a fixed length and comprising an anchor end, attached to the second end of the extension member, and a user end, configured to attach to a user; wherein:
when in the extended position, the second end is no more than a second distance away from the first end; and
the sum of the fixed length and the second distance is less than a first distance away from the first end.

2. The apparatus of claim 1, wherein the extension member comprises a telescoping structure.

3. The apparatus of claim 2, wherein:
the telescoping structure comprises a plurality of elongated tubes nested together;
each elongated tube of the plurality of elongated tubes comprises a proximal end and a distal end;
the proximal end of an outermost elongated tube of the plurality of elongated tubes defines the first end of the extension member; and
the distal end of an innermost elongated tube of the plurality of elongated tubes defines the second end of the extension member.

4. The apparatus of claim 1, wherein the extension member comprises a scissoring structure.

5. The apparatus of claim 4, wherein:
the scissoring structure comprises a plurality of folding supports pivotably linked together;
each folding support of the plurality of folding supports comprises two linkages pivotably coupled together to form an X-shape;
each folding support of the plurality of folding supports comprises a proximal end and a distal end;
the proximal end of a first folding support defines the first end of the extension member; and
the distal end of a last folding support defines the second end of the extension member.

6. The apparatus of claim 1, wherein the first end slides along the at least one rail in the third direction as a force is applied at the second end of the extension member in the third direction.

7. A fall restraint system comprising:
an extension member, comprising a first end and a second end that is opposite the first end, wherein:
the second end is movable relative to the first end along a plane; and
the second end is configured to extend away from the first end to an extended position and retract from the extended position toward the first end to a retracted position;
a flexible tether, having a fixed length and comprising an anchor end, attached to the second end of the extension member, and a user end, configured to attach to a user, wherein:
when in the extended position, the second end is no more than a second distance away from the first end; and
the sum of the fixed length and the second distance is less than a first distance away from the first end;
at least one sensor configured to detect a location of the user end of the flexible tether relative to the first end of the extension member; and
a controller in electrical communication with the extension member and configured to move the second end of the extension member relative to the first end of the extension member wherein the controller is further configured to prevent extension of the extension member based on the location of the user detected by the at least one sensor.

8. The system of claim 7, wherein the controller is selectively operable by the user.

9. The system of claim 7, further comprising an elevated platform on which the user is supportable, wherein the at least one sensor is coupled to the elevated platform and is configured to detect an edge of the elevated platform.

10. The system of claim 9, further comprising a plurality of sensors, wherein:

the elevated platform further comprises a plurality of interconnectable segments;

each one of the interconnectable segments comprises at least one of the plurality of sensors; and the at least one of the plurality of sensors of each one of the interconnectable segments is switchable between an active state and an inactive state based on whether the interconnectable segment defines the edge of the elevated platform.

11. The system of claim 7, further comprising at least one rail to which the extension member is movably coupled so that the extension member is movable in a third direction along the at least one rail, the third direction being angled relative to the first direction and the second direction, wherein the controller is configured to move the first end of the extension member along the at least one rail in the third direction.

12. The system of claim 11, wherein the extension member is not permitted to move beyond the fixed length of the flexible tether from a lateral distance from the first end of the extension member.

13. The system of claim 11, wherein the controller is further configured to prevent movement of first end of the extension member in the third direction along the at least one rail of the extension member based on the location of the user detected by the at least one sensor.

14. The system of claim 13, further comprising a plurality of sensors, wherein:

the elevated platform further comprises a plurality of interconnectable segments;

each one of the interconnectable segments comprises at least one of the plurality of sensors; and the at least one of the plurality of sensors of each one of the interconnectable segments is switchable between an active state and an inactive state based on whether the interconnectable segment defines the edge of the elevated platform.

15. The system of claim 7, further comprising a selectively movable support structure, wherein the first end of the extension member is attached to the selectively movable support structure.

16. The system of claim 15, wherein the selectively movable support structure is a lift vehicle.

17. A method for preventing a user from moving beyond a first distance from a support structure, the method comprising:

securing a user to a user end of a flexible tether, having a fixed length and comprising an anchor end, opposite the user end, attached to a second end of an extension member, the extension member comprising a first end that is opposite the second end, wherein:

the first end is configured to be fixed to the support structure;

the second end is movable relative to the first end along a plane;

the second end is configured to extend away from the first end to an extended position and retract from the extended position toward the first end to a retracted position;

adjusting a second length of the extension member, wherein:

in the extended position, the second end is no more than a second distance away from the first end; and the sum of the fixed length and the second length is less than the first distance; and operating a controller in electrical communication with the extension member to adjust a lateral position of the extension member along at least one rail horizontally fixed to the support structure.

18. The method of claim 17, further comprising operating a controller in electrical communication with the extension member to adjust the second distance of the extension member.

19. The method of claim 17, wherein the extension member comprises a scissoring structure, and the method further comprises moving the second end relative to the first end by actuating the scissoring structure.

20. The method of claim 17, wherein the extension member comprises a telescoping structure, and the method further comprises moving the second end relative to the first end by actuating the telescoping structure.

* * * * *